United States Patent
Yamada

(10) Patent No.: US 8,243,393 B2
(45) Date of Patent: Aug. 14, 2012

(54) DISK DRIVE FLEXURE

(75) Inventor: Yukie Yamada, Aiko-gun (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 0 days.

(21) Appl. No.: 13/290,313

(22) Filed: Nov. 7, 2011

(65) Prior Publication Data

US 2012/0134056 A1     May 31, 2012

(51) Int. Cl.
*G11B 5/48*     (2006.01)

(52) U.S. Cl. .................................. 360/245.9

(58) Field of Classification Search ............... 360/245.9, 360/245.7, 245.3, 245.8, 245, 245.4, 244.3, 360/234.5, 244.8, 244.1, 244
See application file for complete search history.

(56) References Cited

U.S. PATENT DOCUMENTS

| | | | | |
|---|---|---|---|---|
| 6,381,099 | B1* | 4/2002 | Mei | 360/244.3 |
| 6,757,137 | B1* | 6/2004 | Mei | 360/245.7 |
| 7,075,701 | B2* | 7/2006 | Novotny et al. | 359/291 |
| 7,375,874 | B1* | 5/2008 | Novotny et al. | 359/291 |
| 7,388,733 | B2* | 6/2008 | Swanson et al. | 360/245.9 |
| 7,440,236 | B1* | 10/2008 | Bennin et al. | 360/294.4 |
| 7,652,890 | B2* | 1/2010 | Ohsawa et al. | 361/749 |
| 7,764,467 | B2* | 7/2010 | Hanya et al. | 360/245.7 |
| 7,876,664 | B2* | 1/2011 | Tsukagoshi et al. | 369/275.1 |
| 8,111,483 | B2* | 2/2012 | Arai | 360/245.9 |
| 2005/0030670 | A1* | 2/2005 | Ando et al. | 360/244.8 |
| 2009/0151994 | A1* | 6/2009 | Ohsawa et al. | 174/261 |
| 2010/0176827 | A1* | 7/2010 | Yamazaki et al. | 324/699 |
| 2010/0195474 | A1* | 8/2010 | Tsukuda et al. | 369/112.23 |
| 2012/0067626 | A1* | 3/2012 | Mizutani | 174/255 |

FOREIGN PATENT DOCUMENTS

| | | |
|---|---|---|
| JP | 2010-61782 A | 3/2010 |
| JP | 2010-170626 A | 8/2010 |

* cited by examiner

*Primary Examiner* — Allen Cao
(74) *Attorney, Agent, or Firm* — Holtz, Holtz, Goodman & Chick, PC

(57) ABSTRACT

A flexure includes a metal base and a wiring portion. The wiring portion is constituted of an insulating layer, a conductor group, and others. A tongue portion is formed to a main portion of the metal base. A slider including an attached electronic unit is disposed to the tongue portion. The conductor group includes conductors electrically connected to the slider and conductors electrically connected to the attached electronic unit. Island-shaped electrical circuit portions are formed on the metal base. The electrical circuit portions are electrically independent from the main portion of the metal base. The conductors for the attached electronic unit are electrically conductive with respect to the electrical circuit portions through conductor coupling portions piercing the insulating layer. The electrical circuit portions are connected to terminal portions of the attached electronic unit.

9 Claims, 8 Drawing Sheets

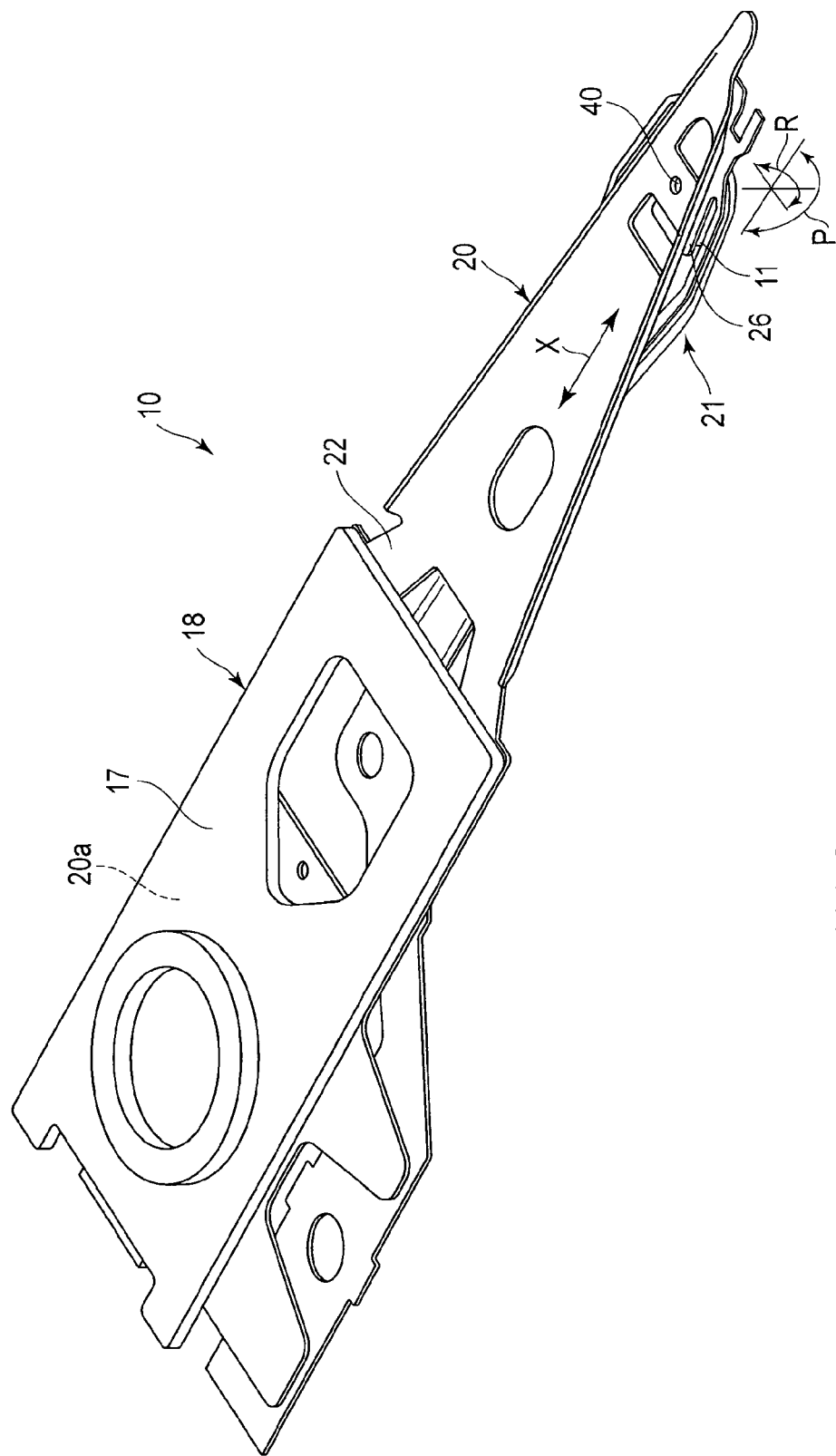
F I G. 3

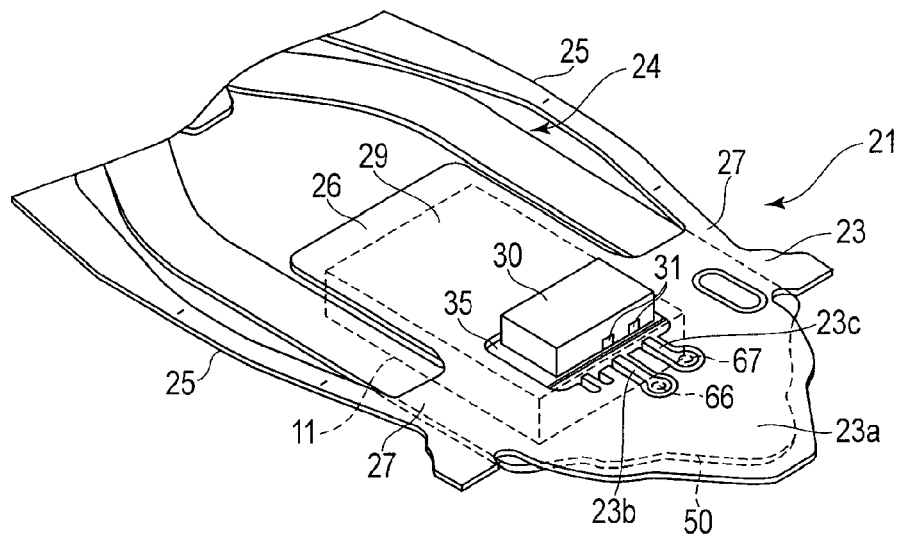
F I G. 4
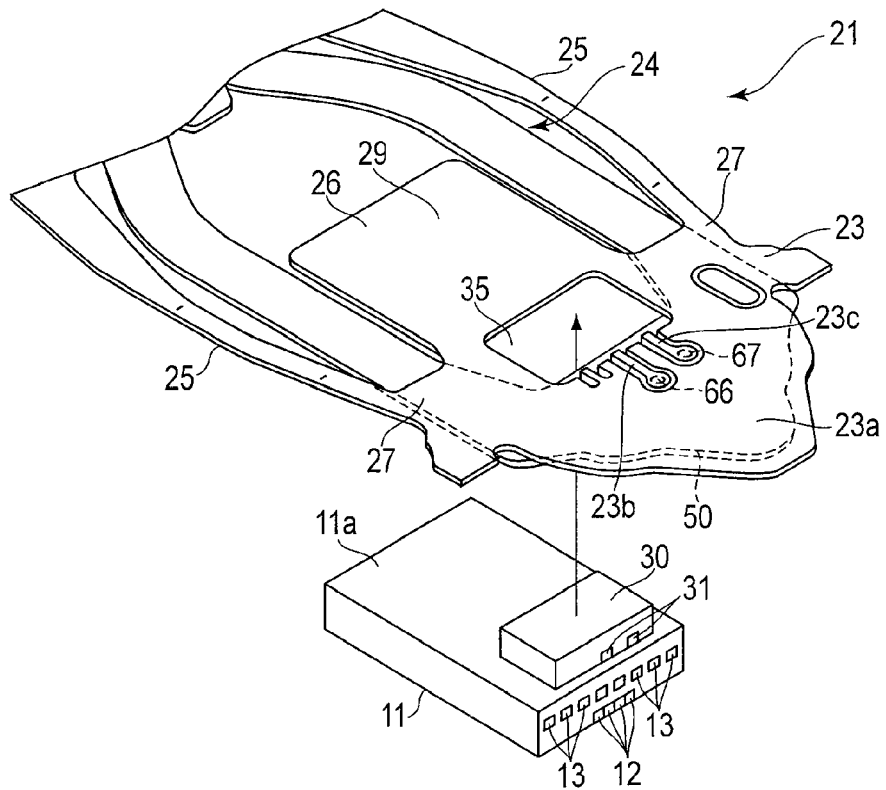
F I G. 5

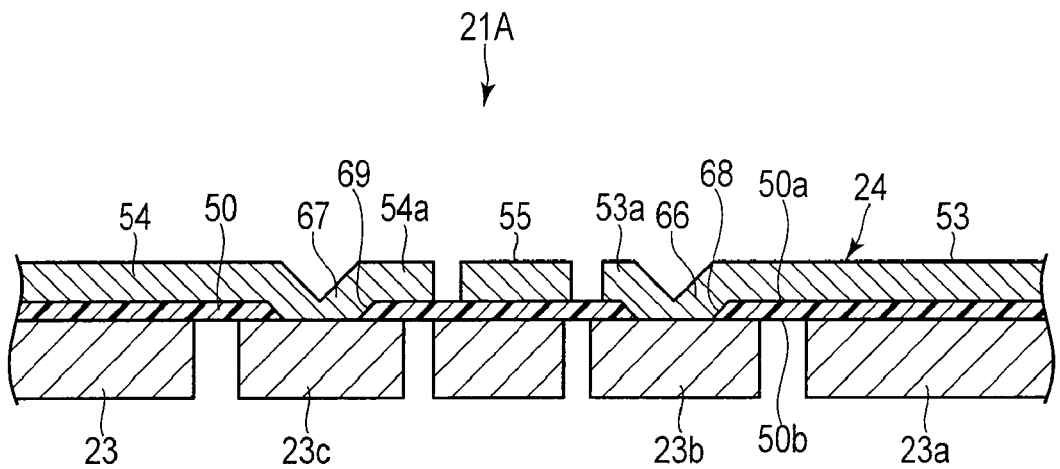
F I G. 11
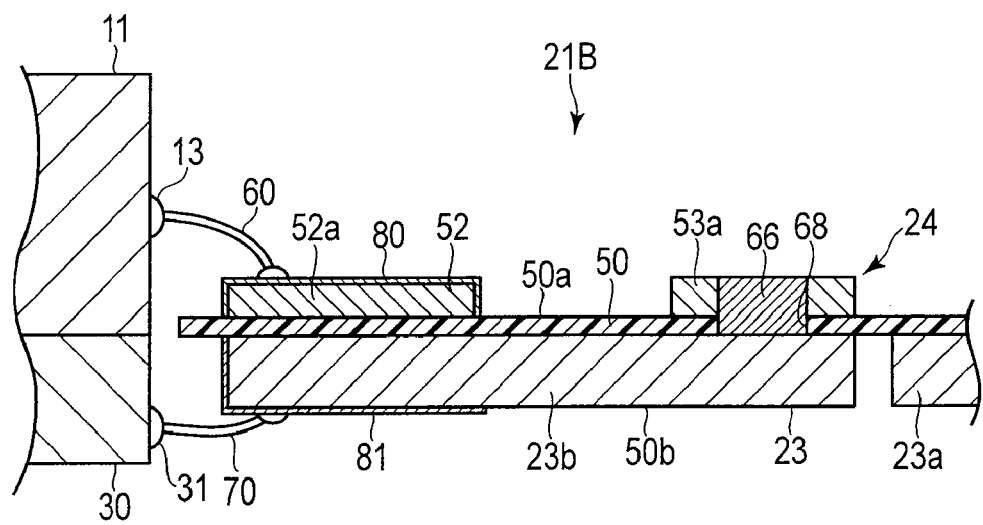
F I G. 12

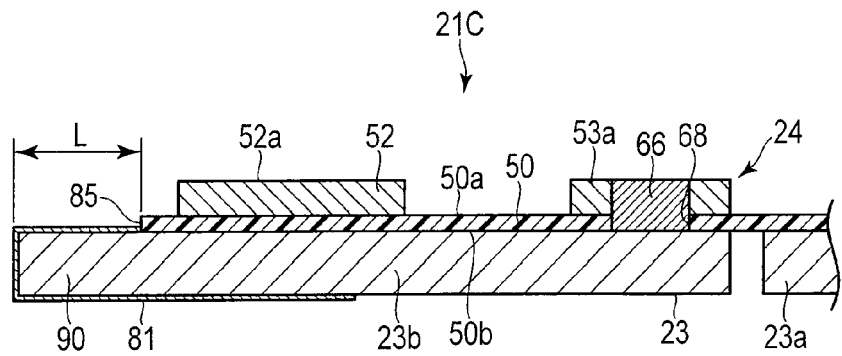
F I G. 13
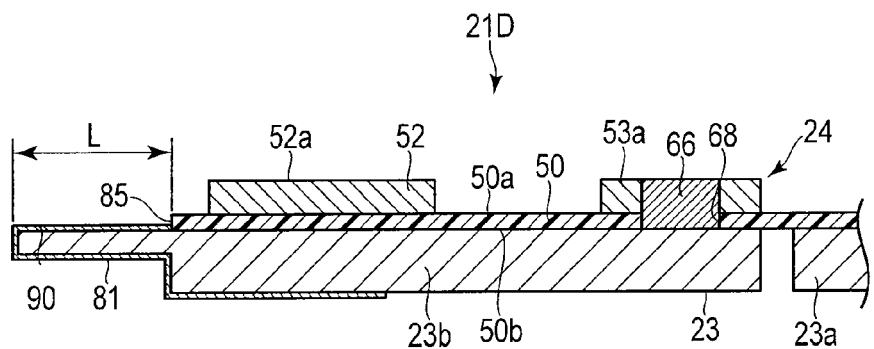
F I G. 14
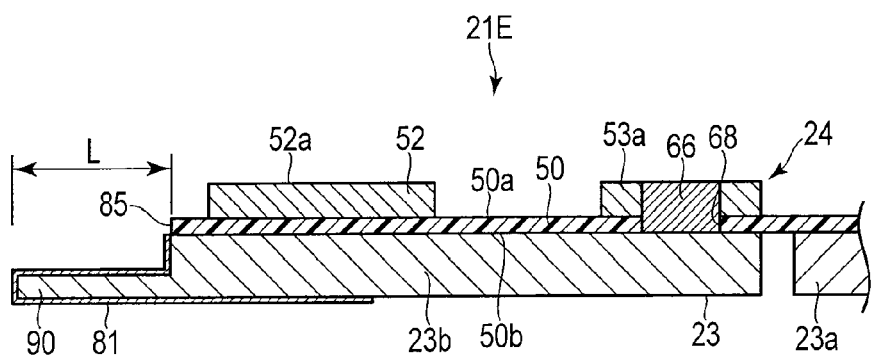
F I G. 15

DISK DRIVE FLEXURE

CROSS-REFERENCE TO RELATED APPLICATIONS

This application is based upon and claims the benefit of priority from prior Japanese Patent Application No. 2010-267593, filed Nov. 30, 2010, the entire contents of which are incorporated herein by reference.

BACKGROUND OF THE INVENTION

1. Field of the Invention

The present invention relates to disk drive flexure used in a disk drive for an information processing apparatus, such as a personal computer.

2. Description of the Related Art

A hard disk drive (HDD) is used in an information processing apparatus such as a personal computer. The hard disk drive includes a magnetic disk rotatable about a spindle, a carriage turnable about a pivot, etc. A disk drive suspension is disposed on an arm of the carriage.

The disk drive suspension has a load beam, a flexure arranged to overlap the load beam, and others. A slider is mounted on a gimbal portion formed near the distal end of the flexure. The slider is provided with elements (transducers) for accessing data, that is, for reading or writing data. The suspension, flexure, etc., constitute a head gimbal assembly.

As the flexure, various conformations are in practical use in accordance with required specifications. For example, a flexure with conductors includes a metal base formed of a thin stainless steel sheet, an insulating layer made of an electrically insulative material such as polyimide formed on this metal base, and conductors made of copper formed on this insulating layer. One end of each conductor is connected to an element (e.g., an MR element) provided on the slider. The other end of each conductor is connected to an electrical circuit such as an amplifier.

Further, a slider including an attached electronic unit such as a thermal assist device is also known. For example, Jpn. Pat. Appln. KOKAI Publication No. 2010-61782 (Patent Literature 1) discloses a thermal assist recording head. In this thermal assist recording head, a thermal assist device having a laser diode is arranged on a back surface of the slider. A wiring portion of the flexure for use in such a thermal assist recording head has a conductor for the slider and a conductor for the thermal assist device. The conductor for the slider is connected to a terminal of the slider, and the conductor for the thermal assist device is connected to a terminal of the thermal assist device.

The thermal assist device according to Patent Literature 1 is arranged on the back surface of the slider. In this thermal assist device, a position of the terminal of the slider is different from a position of the terminal of the thermal assist device in the thickness direction of the wiring portion. In a wiring portion which is of a single-layer type, all conductors are formed on the same surface. Therefore, in Patent Literature 1, a wiring configuration for achieving connection of the conductors with the terminal of the slider and connection of the conductors with the terminal of the thermal assist device is complicated, and a cost required for the wiring section is increased.

Jpn. Pat. Appin. KOKAI Publication No. 2010-170626 (Patent Literature 2) discloses a suspension substrate having a slider terminal and a light-emitting element terminal. In a wiring configuration of Patent Literature 2, an auxiliary section formed on the suspension substrate is bent 180°. Further, an end portion of a light-emitting element conductor is arranged to face the light-emitting element terminal by overlapping this auxiliary section with a substrate body section.

The thermal assist recording head in Patent Literature 1 has a complicated wiring configuration for connecting the wiring portion to a light source unit. In the suspension substrate in Patent Literature 2, bending the auxiliary section itself 180° is difficult. Furthermore, since the auxiliary section overlaps the substrate body section, the thickness of a tongue portion increases. Moreover, this overlap can be a factor that deteriorates flatness of the tongue portion or varies the thickness of the tongue section.

In the suspension having the attached electronic unit, for example, the thermal assist device or a light-emitting device, simplifying the wiring configuration of the flexure is desired. Therefore, arranging a slider conductor and an attached electronic unit conductor on the same plane is preferable. That is, a single-layer type wiring portion is desirable. However, in the single-layer type wiring portion, end portions of many conductors must be arranged in a narrow region near the slider in close proximity to each other. Therefore, a distance between the respective conductors is two small, and assuring electrical insulation of the conductors is difficult.

BRIEF SUMMARY OF THE INVENTION

Accordingly, the object of this invention is to provide a disk drive flexure provided with a slider including an attached electronic unit mounted thereon, whose wiring structure being simplified.

A disk drive flexure according to the present invention comprises a metal base which has a tongue portion, an insulating layer made of an electrically insulative material formed on the metal base, and a conductor group formed on the insulating layer. The conductor group includes a conductor electrically connected to the slider and a conductor electrically connected to the attached electronic unit. The flexure further comprises an electrical circuit portion formed on a part of the metal base and a conductor coupling portion formed by plating for example. The electrical circuit portion is electrically independent of a main portion of the metal base and connected to a terminal portion of the attached electronic unit. The conductor coupling portion pierces the insulating layer in a thickness direction and electrically couples the electrical circuit portion with the conductor connected to the attached electronic unit.

This structure is applied to a disk drive flexure provided with a slider including an attached electronic unit mounted thereon. According to the flexure of this type, the end portion of the conductor connected to the slider and the electrical circuit portion connected to the attached electronic unit conductor are separately arranged on the first surface and the second surface of the insulating layer, respectively. Accordingly, sufficiently large distances can be assured between the terminals of each conductor which are arranged near the tongue portion. Since the electrical circuit portion is formed on a part of the metal base, no extra part is needed for the electrical circuit portion and the wiring configuration can be made simple.

In one embodiment of the present invention, the electrical circuit portion is formed by etching a part of the metal base. The electrical circuit portion may be covered with a gold plating layer. An overhang portion protruding from an end of the insulating layer toward the tongue portion may be provided at an end portion of the electrical circuit portion. The thickness of the overhang portion may be less than the thickness of the main portion of the metal base.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a perspective view of a disk drive suspension having a flexure according to a first embodiment of the present invention;

FIG. 4 is a perspective view of a part of the flexure of a suspension and the slider including an attached electronic unit depicted in FIG. 3;

FIG. 5 is a perspective view showing a state that a part of the flexure and the slider including the attached electronic unit depicted in FIG. 4 are separated from each other;

FIG. 11 is a cross-sectional view showing a part of a flexure according to a second embodiment of the present invention;

FIG. 12 is a cross-sectional view showing a part of a flexure and a part of a slider including an attached electronic unit according to a third embodiment of the present invention;

FIG. 13 is a cross-sectional view showing a part of a flexure according to a fourth embodiment of the to the present invention;

FIG. 14 is a cross-sectional view showing a part of a flexure according to a fifth embodiment of the present invention; and FIG. 15 is a cross-sectional view showing a part of a flexure according to a sixth embodiment of the present invention.

DETAILED DESCRIPTION OF THE INVENTION

Hereinafter, a disk drive flexure according to a first embodiment of the present invention will be described with reference to FIG. 1 to FIG. 10.

Figure 1:
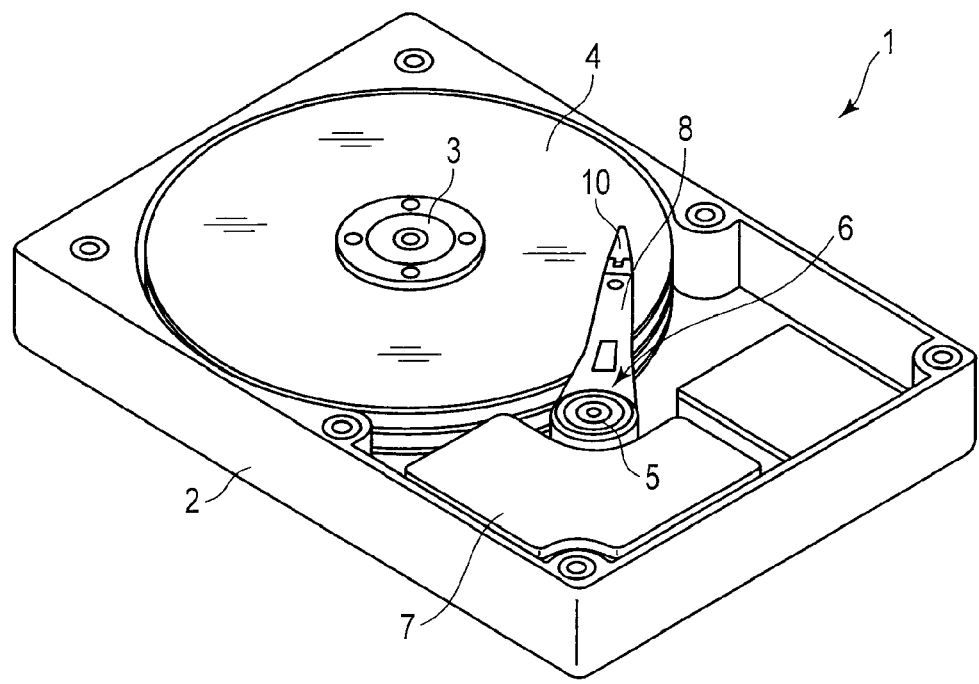
FIG. 1 is a perspective view showing an example of a disk drive.

A disk drive (HDD) 1 shown in FIG. 1 has a case 2, magnetic disks 4, a carriage 6, a positioning motor 7, and others. Each disk 4 rotates about a spindle 3. The carriage 6 is turnable about a pivot 5. The positioning motor 7 drives the carriage 6. The case 2 is hermetically closed by a non-illustrated lid.

Figure 2:
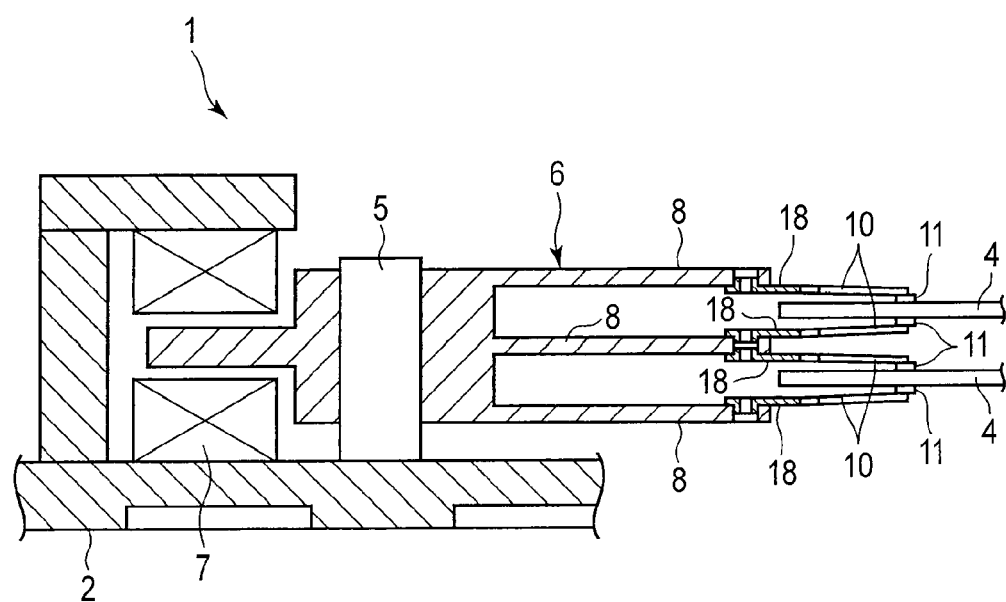
FIG. 2 is a cross-sectional view of a part of the disk drive depicted in FIG. 1.

FIG. 2 is a cross-sectional view schematically showing a part of the disk drive 1. As shown in FIG. 2, arms (actuator arms) 8 are provided on the carriage 6. Suspensions 10 are disposed at distal ends of the actuator arms 8. Sliders 11 constituting magnetic heads are provided at distal ends of the suspensions 10. When each disk 4 rotates at high speed, an air bearing is formed between the disk 4 and the slider 11.

When the carriage 6 is turned by the positioning motor 7, the suspensions 10 move radially relative to the disks 4. As a result, the sliders 11 move to desired tracks of the disks 4. Elements 12 (which are schematically shown in FIG. 5) and terminal portions 13 electrically conductive with respect to the elements 12 are provided on an end portion of the slider 11. The elements 12 convert an electrical signal and a magnetic signal like an MR element, for example. These elements 12 enable accessing for, for example, writing or reading data to or from each disk 4. The suspension 10 and the slider 11 constitutes a head gimbal assembly.

FIG. 3 shows the suspension 10 according to the first embodiment of the present invention. This suspension 10 comprises a base portion 18 including a base plate 17, a load beam 20, a flexure with conductors 21, and others. A base 20a of the load beam 20 overlaps the base plate 17. The thickness of the load beam 20 is, for example, approximately 30 to 100 μm.

The load beam 20 is fixed to the actuator arm 8 (shown in FIG. 1 and FIG. 2) through the base portion 18. A hinge portion 22 is formed on the load beam 20. The hinge portion 22 has spring properties enabling elastically bending in the thickness direction. A direction indicated by an arrow X in FIG. 3 is a longitudinal direction (a front-back direction) of the suspension 10, i.e., a longitudinal direction of the load beam 20.

Figure 6:
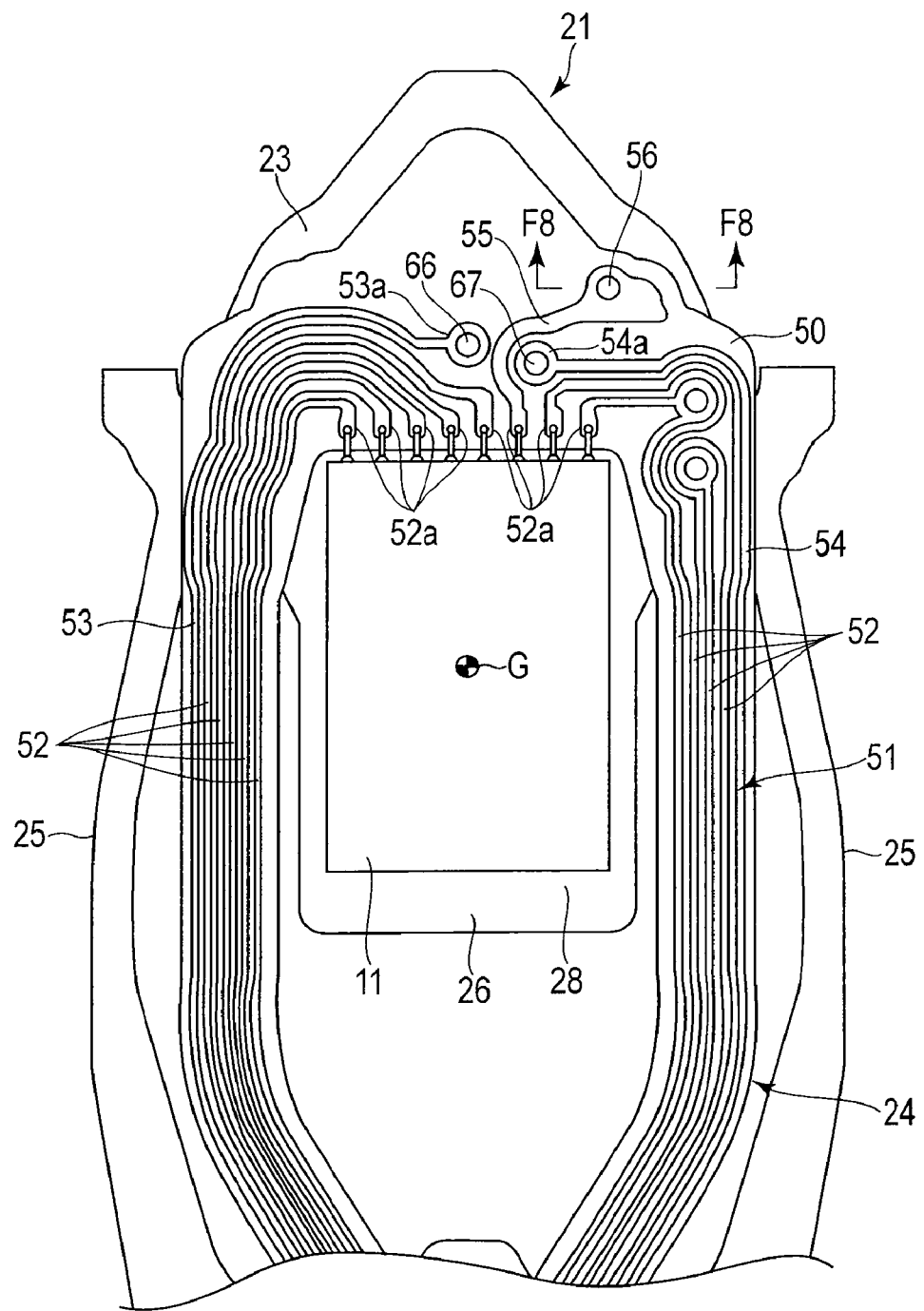
FIG. 6 is a plan view showing a part of the flexure and the slider depicted in FIG. 4.
Figure 7:
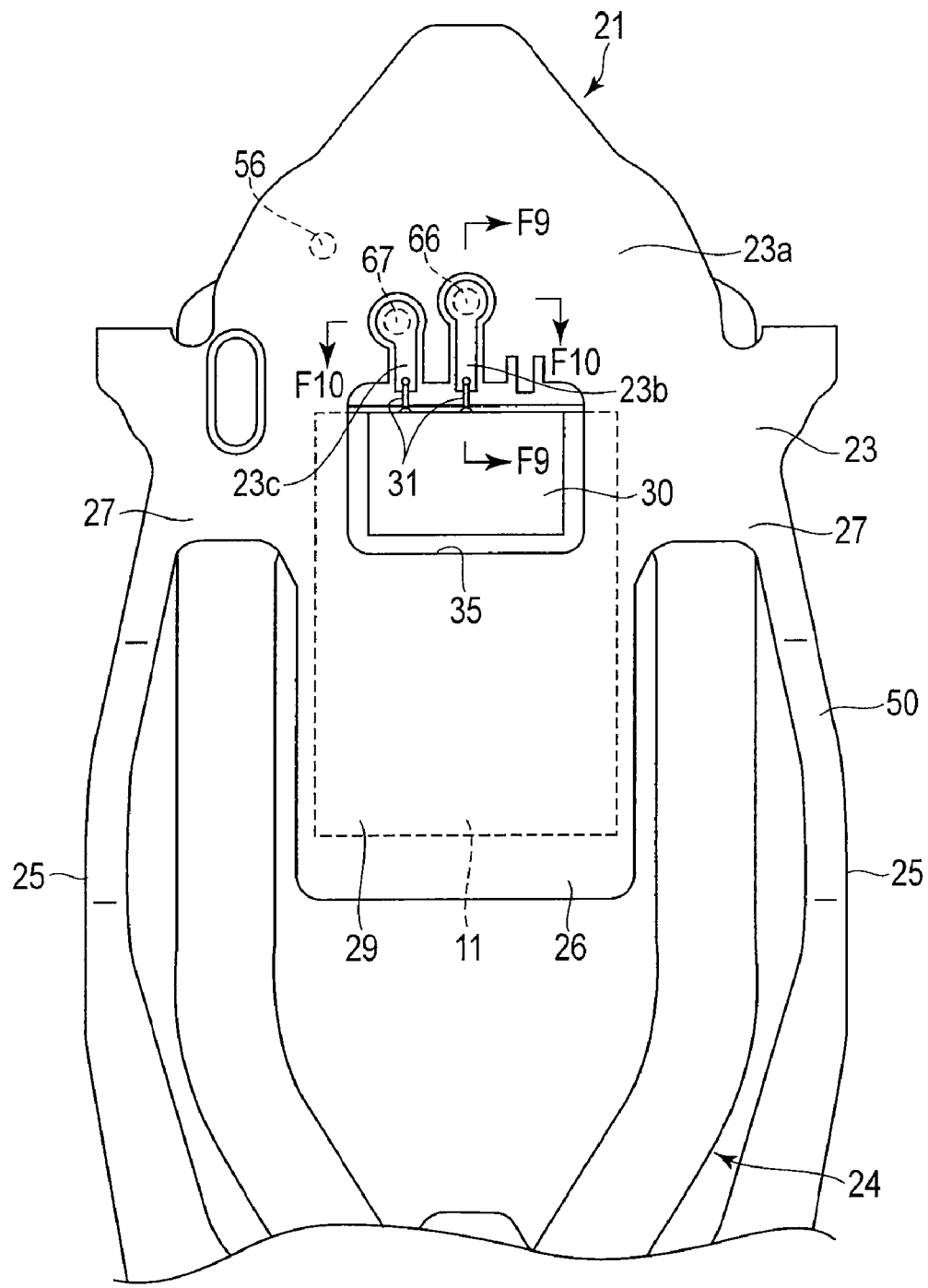
FIG. 7 is a plan view showing part of the flexure and the slider depicted in FIG. 6 from the opposite side.

FIG. 4 and FIG. 5 are perspective views each showing a distal end of the flexure with conductors 21 (which will be simply referred to as a flexure hereinafter). FIG. 6 is a plan view showing the distal end of the flexure 21 from one side, and FIG. 7 is a plan view showing the distal end of the flexure 21 from the opposite side. This flexure 21 is provided along the longitudinal direction of the load beam 20 as shown in FIG. 3.

The flexure 21 includes a metal base 23, a wiring portion 24, and others. The metal base 23 is formed of a metal plate thinner than the load beam 20. The wiring portion 24 is formed along the metal base 23. The metal base 23 is formed into a predetermined pattern by etching a plate made of stainless steel such as SUS 304. As chemical components, the SUS 304 contains carbon which is 0.08 or below, silicon which is 1.00 or below, manganese which is 2.00 or below, nickel which is 8.00 to 10.50, chromium which is 18.00 to 20.00, and iron as a remnant. The thickness of the metal base 23 is less than that of the load beam 20. The thickness of the metal base 23 is, for example, 10 to 25 μm. The metal base 23 is fixed at a predetermined position of the load beam 20 by laser welding and the like.

The flexure 21 integrally includes a pair of left and right outrigger portions 25 and a tongue portion 26 which is a movable part. A continuous portion 27 is formed near a distal end of the load beam 20. The tongue portion 26 is continuous with the outrigger portions 25 through the continuous portion 27. A main portion 23a of the metal base 23 has spring properties. The tongue portion 26 is formed at a part of the main portion 23a of the metal base 23. The tongue portion 26 can elastically bend in the thickness direction.

The metal base 23 has a first surface 28 (shown in FIG. 6) to which the slider 11 is fixed and a second surface 29 (shown in FIG. 4 and FIG. 5) on the opposite side of the slider 11.

An attached electronic unit 30 is provided on a back surface 11a (shown in FIG. 5) of the slider 11. An example of the attached electronic unit 30 is a thermal assist device including a laser diode. This attached electronic unit 30 can heat a recording surface of the disk 4 with a laser beam. Terminal portions 31 are provided on an end face of the attached electronic unit 30.

The slider 11 including the attached electronic unit 30 is arranged on the first surface 28 of the tongue portion 26. This slider 11 is fixed to the tongue portion 26 by fixing means such as an adhesive. An opening 35 into which the attached electronic unit 30 is inserted is formed in a region including the tongue portion 26 of the flexure 21. As shown in FIG. 4 and FIG. 5, the attached electronic unit 30 is inserted in the opening 35. The back surface 11a of the slider 11 is fixed to the tongue portion 26. Adopting such a configuration enables the terminal portions 13 of the slider 11 to face the first surface 28 of the metal base 23 and also enables the terminal portions 31 of the attached electronic unit 30 to face the second surface 29 of the metal base 23.

A dimple 40 (shown in FIG. 3) is formed near the distal end of the load beam 20. A back surface of the dimple 40 protrudes toward the second surface 29 of the tongue portion 26. A protruding top of the dimple 40 is in contact with the second surface 29 of the tongue portion 26. As a position of the top of the dimple 40 that is in contact with the tongue portion 26, a position near the center of gravity G (shown in FIG. 6) of the slider 11 including the attached electronic unit 30 is good.

When the top of the dimple 40 is in contact with the tongue portion 26, the tongue portion 26 is supported to enable its oscillating motion. That is, the tongue portion 26 can oscillate in, for example, a rolling direction R and a pitching direction P (shown in FIG. 3) with the top of the dimple 40 being used as a supporting point. The tongue portion 26 and the dimple 40 constitute a gimbal portion that supports the slider 11 to allow its oscillating motion.

Figure 8:
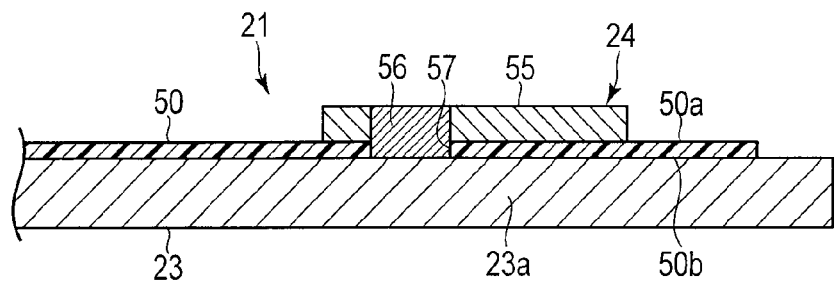
FIG. 8 is a cross-sectional view showing a part of the flexure taken along a line F8-F8 in FIG. 6.
Figure 9:
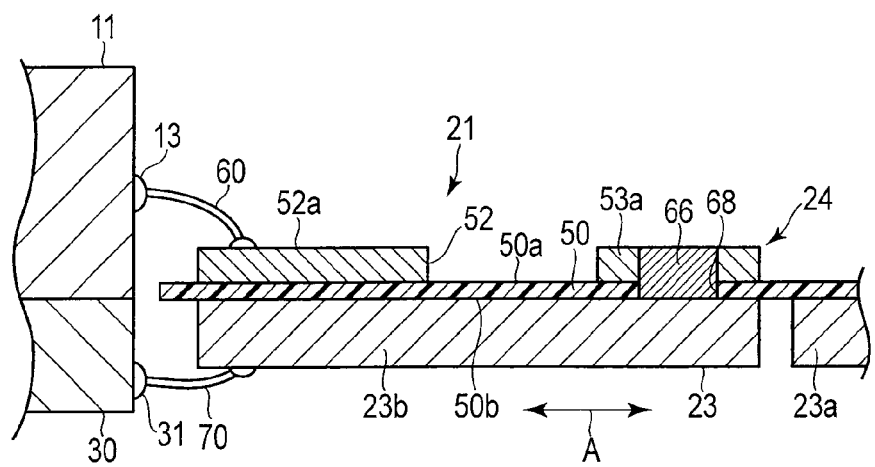
FIG. 9 is a cross-sectional view showing the flexure and a part of the slider including the attached electronic unit taken along a line F9-F9 in FIG. 7.
Figure 10:
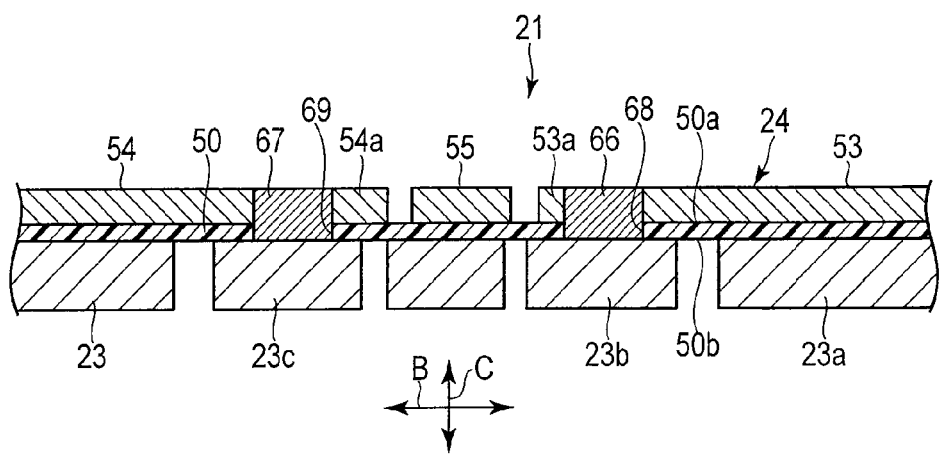
FIG. 10 is a cross-sectional view showing a part of the flexure taken along a line F10-F10 in FIG. 7.

FIG. 8 to FIG. 10 are cross-sectional views of the flexure 21 taken along different positions. In FIG. 9, an arrow A indicates a longitudinal direction of the metal base 23. In FIG. 10, an arrow B indicates a width direction of the metal base 23, and an arrow C indicates the thickness direction.

The wiring portion 24 of the flexure 21 includes an insulating layer 50 formed on the metal base 23 and a conductor group 51 (shown in FIG. 6) made of a conductive material such as copper. The insulating layer 50 is made of an electrically insulative material such as polyimide. The conductor group 51 is covered with a cover layer (not shown) made of an electrically insulative material such as polyimide.

The insulating layer 50 has a first surface 50a placed on the upper side in FIG. 8 and a second surface 50b placed on the opposite side (the lower side in FIG. 8) of the first surface 50a. The conductor group 51 is formed on the first surface 50a of the insulating layer 50. The second surface 50b is in contact with the metal base 23. The metal base 23 and the conductor group 51 are electrically insulated from each other by the insulating layer 50. An example of the thickness of each of the insulating layer 50 and the conductor group 51 is 10 μm.

The conductor group 51 includes slider conductors 52, a pair of conductors 53 and 54, and an ground conductor 55. The slider conductors 52 are electrically connected to the terminal portions 13 of the slider 11. The conductors 53 and 54 are electrically connected to the terminal portions 31 of the attached electronic unit 30. These conductors 52, 53, 54, and 55 are made of a metal having high conductivity (e.g., plating copper) and formed into predetermined patterns on the insulating layer 50 by etching.

As shown in FIG. 8, the ground conductor 55 is electrically connected to the main portion 23a of the metal base 23 through a conductor coupling portion 56. The conductor coupling portion 56 is formed in a hole 57 of the insulating layer 50 by using a conductive material such as nickel plating. The conductor coupling portion 56 pierces the insulating layer 50 in the thickness direction. This conductor coupling portion 56 achieves electrical conduction between the main portion 23a of the metal base 23 and the ground conductor 55.

As shown in FIG. 6, one end portion 52a of each of the slider conductors 52 is connected to the terminal portion 13 of the slider 11 through a bonding member 60 (partially shown in FIG. 9). The other end portion of each slider conductor 52 is connected to an amplifier (not shown) of the disk drive 1. A current flows through each slider conductor 52 when accessing for, for example, writing or reading data with respect to each disk 4.

As shown in FIG. 7 and others, a pair of electrical circuit portions 23b and 23c are formed on the metal base 23. These electrical circuit portions 23b and 23c are formed into island shapes which are electrically independent from each other by etching a part of the metal base 23. Each of the electrical circuit portions 23b and 23c has an outline formed by etching. The electrical circuit portions 23b and 23c are electrically independent from the main portion 23a of the metal base 23.

Conductor coupling portions 66 and 67 are provided at positions associated with the electrical circuit portions 23b and 23c. The conductor coupling portions 66 and 67 are formed of a conductive material such as nickel plating. These conductor coupling portions 66 and 67 are formed in respective holes 68 and 69 and pierce the insulating layer 50 in the thickness direction.

One end portion 53a or 54a (shown in FIG. 6) of each of the conductors 53 and 54 of the attached electronic unit 30 is connected to each of the electrical circuit portions 23b and 23c (shown in FIG. 7) of the metal base 23 through each of the conductor coupling portions 66 and 67. These electrical circuit portions 23b and 23c are connected to the terminal portions 31 of the attached electronic unit 30 through bonding members 70 (partially shown in FIG. 9). The other end portion of each of the conductors 53 and 54 of the attached electronic unit 30 is connected to a non-illustrated laser diode circuit. A current or a signal for driving the attached electronic unit 30 is supplied to the attached electronic unit 30 through the conductors 53 and 54.

According to the flexure 21 of this embodiment, the end portion 52a of each slider conductor 52 is connected to the terminal portion 13 of the slider 11 on the same side as the first surface 50a of the insulating layer 50. The end portions 53a and 54a of the attached electronic unit conductors 53 and 54 are connected to the electrical circuit portions 23b and 23c through the conductor coupling portions 66 and 67. The electrical circuit portions 23b and 23c are connected to the terminal portions 31 of the attached electronic unit 30 on the same side as the second surface 50b of the insulating layer 50.

That is, the end portion 52a of each slider conductor 52 and the end portions 53a and 54a of the attached electronic unit conductors 53 and 54 are separately arranged on the first surface 50a and the second surface 50b of the insulating layer 50 to sandwich the insulating layer 50 therebetween, respectively. Therefore, the end portion 52a of each slider conductor 52 and the end portions 53a and 54a of the attached electronic unit conductors 53 and 54 do not have to be arranged on the same plane. Accordingly, sufficiently large distances can be assured between the end portions 52a, 53a, and 54a.

The electrical circuit portions 23a and 23c are formed on a part of the metal base 23 by, for example, etching. Therefore, an extra wiring member for the electrical circuit portions 23b and 23c is not required. Further, forming the single-layer type conductor group 51 on one side (the first surface 50a) of the insulating layer 50 alone can suffice. Therefore, the wiring configuration according to this embodiment is simpler than that of a wiring portion having a multi-layer type conductor group, and its manufacturing process is simple. Furthermore, as compared with a conventional wiring configuration (e.g., Patent Literature 2) in which an auxiliary portion provided at an end of a wiring portion is folded back 180°, the tongue portion can be formed with a small thickness and a small weight.

FIG. 11 is a cross-sectional view showing a part of a flexure 21A according to a second embodiment of the present invention. In the flexure 21A according to this embodiment, conductors 53 and 54 formed by plating partially enter holes 68 and 69 formed in an insulating layer 50. Parts of the conductors 53 and 54 having entered the holes 68 and 69 constitute conductor coupling portions 66 and 67. Any other structures, functions, and effects of this flexure 21A are the same as those in the flexure 21 according to the first embodiment, and hence the same reference numbers as those in the first embodiment are used, thereby omitting description thereof.

FIG. 12 is a cross-sectional view showing a part of a flexure 21B according to a third embodiment of the present invention. In this flexure 21B, gold plating layers 80 and 81 are formed on a surface of an end portion 52a of a slider conductor 52 and an electrical circuit portion 23b of a metal base 23, respectively. The gold plating layers 80 and 81 can improve bonding properties of bonding members 60 and 70. Any other structures, functions, and effects of this flexure 21B are the same as those of the flexure 21 according to the first embodiment, and hence the same reference numbers as those in the first embodiment are used to omit description.

FIG. 13 is a cross-sectional view showing a part of a flexure 21C according to a fourth embodiment of the present invention. In this flexure 21C, an overhang portion 90 having a length L is formed at an end portion of an electrical circuit portion 23b of a metal base 23. The overhang portion 90 protrudes from an end 85 of an insulating layer 50 toward a tongue portion 26. This overhang portion 90 achieves electrical connection (bonding) with respect to terminal portions 31 of an attached electronic unit 30. A gold plating layer 81 may be formed on the overhang portion 90. Any other structures, functions, and effects of this flexure 21C are the same as those of the flexure 21 according to the first embodiment, and hence the same reference numbers as those in the first embodiment are used to omit description thereof.

FIG. 14 is a cross-sectional view showing a part of a flexure 21D according to a fifth embodiment of the present invention. In this flexure 21D, an overhang portion 90 having a length L is likewise formed at an end portion of an electrical circuit portion 23b of a metal base 23. Furthermore, the thickness of the overhang portion 90 is reduced to be less than that of a main portion 23a of the metal base 23 by processing one surface of the overhang portion 90 based on partial etching and the like. Rigidity of the overhang portion 90 is less than that of a main portion 23a of a metal base 23. Any other structures, functions, and effects of this flexure 21D are the same as those of the flexure 21C according to the fourth embodiment (FIG. 13).

FIG. 15 is a cross-sectional view showing a part of a flexure 21E according to a sixth embodiment of the present invention. In this flexure 21E, other surface of an overhang portion 90 is processed by partial etching and the like. The thickness of the overhang portion 90 is less than that of a main portion 23a of a metal base 23. Any other structures, functions, and effects of this flexure 21E are the same as those of the flexure 21D according to the fifth embodiment (FIG. 14).

In addition, to carry out the present invention, it is needless to say that the constituent elements of the flexure including the metal base, the insulating layer, the conductor group, the electrical circuit portions, and others can be modified to be embodied in many ways. Further, the attached electronic unit provided on the slider may be an electronic component other than the thermal assist device using the laser diode.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive flexure provided on a load beam of a disk drive suspension, comprising:
    a metal base which has a tongue portion having a slider including an attached electronic unit mounted thereon and is made of a metal;
    an insulating layer made of an electrically insulative material formed on the metal base;
    a conductor group which is formed on the insulating layer and includes a conductor electrically connected to the slider and a conductor for the attached electronic unit which is electrically connected to the attached electronic unit;
    an electrical circuit portion which is formed on a part of the metal base, electrically independent from a main portion of the metal base, and connected to a terminal portion of the attached electronic unit; and
    a conductor coupling portion which pierces the insulating layer in a thickness direction and electrically couples the electrical circuit portion with the conductor for the attached electronic unit.

2. The disk drive flexure according to claim 1, wherein the metal base includes the electrical circuit portion having an etched outline.

3. The disk drive flexure according to claim 1, comprising: a gold plating layer covering a surface of the electrical circuit portion.

4. The disk drive flexure according to claim 1, wherein an overhang portion protruding from an end of the insulating layer toward the tongue portion is provided at an end portion of the electrical circuit portion.

5. The disk drive flexure according to claim 2, wherein an overhang portion protruding from an end of the insulating layer toward the tongue portion is provided at an end portion of the electrical circuit portion.

6. The disk drive flexure according to claim 3, wherein an overhang portion protruding from an end of the insulating layer toward the tongue portion is provided at an end portion of the electrical circuit portion.

7. The disk drive flexure according to claim 4, wherein the thickness of the overhang portion is less than the thickness of the main portion of the metal base.

8. The disk drive flexure according to claim 5, wherein the thickness of the overhang portion is less than the thickness of the main portion of the metal base.

9. The disk drive flexure according to claim 6, wherein the thickness of the overhang portion is less than the thickness of the main portion of the metal base.

* * * * *

UNITED STATES PATENT AND TRADEMARK OFFICE
CERTIFICATE OF CORRECTION

PATENT NO. : 8,243,393 B2  
APPLICATION NO. : 13/290313  
DATED : August 14, 2012  
INVENTOR(S) : Yukie Yamada Page 1 of 1

It is certified that error appears in the above-identified patent and that said Letters Patent is hereby corrected as shown below:

On the title page:

Below item (65) Prior Publication Data;

insert Item --(30) Foreign Application Priority Data:

Nov. 30, 2010   (JP) ................2010-267593--.

Signed and Sealed this  
Twelfth Day of November, 2013

Teresa Stanek Rea  
*Deputy Director of the United States Patent and Trademark Office*